United States Patent
Jeon et al.

(10) Patent No.: US 12,054,683 B2
(45) Date of Patent: Aug. 6, 2024

(54) METHOD OF PRODUCING LUBE BASE OIL FROM MIDDLE DISTILLATE IN PYROLYSIS OIL DERIVED FROM WASTE PLASTIC

(71) Applicants: SK Innovation Co., Ltd., Seoul (KR); SK Geo Centric Co., Ltd., Seoul (KR)

(72) Inventors: Hee Jung Jeon, Daejeon (KR); Yeon Ho Kim, Daejeon (KR); Ok Youn Kim, Daejeon (KR); Seung Eon Lee, Daejeon (KR); Seung Woo Lee, Daejeon (KR); Yoon Kyung Lee, Daejeon (KR); Ka Young Kim, Daejeon (KR); Young Moo Park, Daejeon (KR); Ho Won Lee, Daejeon (KR)

(73) Assignees: SK Innovation Co., Ltd., Seoul (KR); SK Geo Centric Co., Ltd., Seoul (KR)

(*) Notice: Subject to any disclaimer, the term of this patent is extended or adjusted under 35 U.S.C. 154(b) by 0 days.

(21) Appl. No.: 17/896,191

(22) Filed: Aug. 26, 2022

(65) Prior Publication Data
US 2023/0083259 A1    Mar. 16, 2023

(30) Foreign Application Priority Data

Aug. 27, 2021  (KR) .................. 10-2021-0113807

(51) Int. Cl.
*C10G 69/12*    (2006.01)
*C10M 105/04*   (2006.01)
(Continued)

(52) U.S. Cl.
CPC ......... *C10G 69/126* (2013.01); *C10M 105/04* (2013.01); *C10M 177/00* (2013.01);
(Continued)

(58) Field of Classification Search
CPC .............. C01G 45/60; C01G 2300/103; C01G 2300/301; C01G 2300/302; C01G 2300/304; C01G 2400/10
See application file for complete search history.

(56) References Cited

U.S. PATENT DOCUMENTS

| | | | |
|---|---|---|---|
| 2,900,322 A | 8/1959 | Zoeller | |
| 5,107,061 A | 4/1992 | Ou et al. | |

(Continued)

FOREIGN PATENT DOCUMENTS

| | | |
|---|---|---|
| CN | 101724426 A | 6/2010 |
| CN | 102226103 A | 10/2011 |

(Continued)

OTHER PUBLICATIONS

Viswanadham et al., "Octane No. enhancement studies of naphtha over noble metal loaded zeolite catalytsts", Journal of Industrial and Engineering Chemistry, 2013, pp. 950-955, vol. 19.

(Continued)

*Primary Examiner* — Vishal V Vasisth
(74) *Attorney, Agent, or Firm* — The Webb Law Firm

(57) ABSTRACT

Provided are a method of producing a Lube base oil composition including a) reacting at least a part of waste plastic pyrolysis oil having a boiling point in a range of 180 to 340° C. to remove impurities and oligomerize the oil; and b) hydroisomerizing at least a part of the product of step a). A lube base oil composition is also produced therefrom.

8 Claims, 3 Drawing Sheets

(51) Int. Cl.
*C10M 177/00* (2006.01)
*C10N 20/02* (2006.01)
*C10N 30/00* (2006.01)
*C10N 70/00* (2006.01)

(52) U.S. Cl.
CPC ............ *C10G 2300/1003* (2013.01); *C10G 2300/202* (2013.01); *C10G 2300/301* (2013.01); *C10G 2300/302* (2013.01); *C10G 2400/10* (2013.01); *C10M 2203/024* (2013.01); *C10N 2020/02* (2013.01); *C10N 2030/41* (2020.05); *C10N 2070/00* (2013.01)

(56) References Cited

U.S. PATENT DOCUMENTS

| | | |
|---|---|---|
| 5,866,748 A | 2/1999 | Wittenbrink et al. |
| 6,150,577 A | 11/2000 | Miller et al. |
| 6,288,296 B1 | 9/2001 | Miller et al. |
| 2009/0151233 A1* | 6/2009 | Miller ............... C10G 1/10 44/307 |
| 2009/0163391 A1 | 6/2009 | Zakarian et al. |
| 2012/0209017 A1 | 8/2012 | Ouni et al. |
| 2012/0251424 A1 | 10/2012 | Havlik et al. |
| 2016/0264874 A1 | 9/2016 | Narayanaswamy et al. |
| 2017/0263020 A1 | 9/2017 | Huang et al. |
| 2022/0235276 A1 | 7/2022 | Paasikallio et al. |

FOREIGN PATENT DOCUMENTS

| | | |
|---|---|---|
| EP | 0803561 A2 | 10/1997 |
| EP | 0697455 B1 | 9/2001 |
| EP | 2489720 A1 | 8/2012 |
| GB | 2388842 A | 11/2003 |
| JP | H6228568 A | 8/1994 |
| JP | 2005268612 A | 9/2005 |
| JP | 2019519257 A | 7/2019 |
| WO | 2020239729 A1 | 12/2020 |

OTHER PUBLICATIONS

Miller et al., "Conversion of Waste Plastic to Lubricating Base Oil", Energy and Fuels, 2005, pp. 1580-1586, vol. 19, No. 4.

* cited by examiner

METHOD OF PRODUCING LUBE BASE OIL FROM MIDDLE DISTILLATE IN PYROLYSIS OIL DERIVED FROM WASTE PLASTIC

CROSS-REFERENCE TO RELATED APPLICATION

This application claims priority to Korean Patent Application No. 10-2021-0113807, filed Aug. 27, 2021, the disclosure of which is hereby incorporated by reference in its entirety.

BACKGROUND OF THE INVENTION

Field of the Invention

The following disclosure relates to a method of producing a Lube base oil from a middle distillate having a boiling point of 180 to 340° C. in waste plastic pyrolysis oil.

Description of Related Art

Plastic is one of the most innovative materials of the inventions of mankind, and has had a huge impact on human civilization, so that it is not an exaggeration to call the present age the age of plastic. A significantly large amount of plastic which is light and strong and allows adjustment of physical properties to satisfy the physical properties required in various fields has been used. However, it is difficult to decompose plastic in its natural state, and many environmental problems such as occurrence of large amounts of air pollution and hazardous substances are caused during an incineration process, which is becoming a social problem.

The biggest problem of plastic is that plastic has almost no biodegradability. It takes hundreds of years for plastic to decompose and disappear in the natural environment, and plastic is shattered in the process to become microplastic, which may cause various problems. In order to solve the problem, the used plastic should be recycled or reused, but out of 8.3 billion tons of plastic produced from 1950 to 2015, only 9% was recycled and 6.3 billion tons corresponding to 78% were disposed as waste. Since a ban on external export of waste plastic without the consent of foreign countries was negotiated in the Basel convention in Switzerland in May 2019, the importance of a waste plastic treatment technology is greatly increasing.

One of the methods of reusing waste plastic is to convert plastic into an oil fraction by pyrolysis and replace a conventional petroleum-based oil fraction with the oil fraction. However, since the oil fraction recovered by pyrolysis contains large amounts of various impurities such as S, N, O, olefins, and Cl, a post-processing technology for removing impurities is separately required.

The oil fraction from which impurities have been removed by the post-processing technology may be converted into petrochemical products, and a representative of the petrochemical products is a lubricating oil. Materials used for reducing fraction are collectively called lubricating oil, which is a mixture of materials of various functions, but mainly refers to a mixture of a Lube base oil and an additive. A Lube base oil is a material accounting for 80 to 90% corresponding to most of the lubricating oil, is a main material determining the physical property level of the lubricating oil, and is mostly formed of hydrocarbons, and a lack of the physical properties due to the Lube base oil is corrected with the remaining 10 to 20% of an additive material.

Generally, the Lube base oil is produced by separating a heavy oil fraction having a boiling point in a range of 340° C. or higher (C22 or more carbon atoms) from a petroleum-based oil fraction, hydrogenating the heavy oil to remove N, S, an unsaturated double bond, O, and the like, and then performing a hydroisomerization reaction. In the petroleum-based oil fraction, only a C22 or higher heavy oil fraction is converted into a Lube base oil, and an oil fraction in a middle distillate range is not converted into a Lube base oil and used as a fuel and the like.

The Lube base oil may be used in a product range in various fields of application depending on kinematic viscosity (@100° C.), and the most versatile and most used Lube base oil is a low-kinematic viscosity Lube base oil having a kinematic viscosity of 4 cSt. The reason why the amount of low-kinematic viscosity Lube base oil used is increased is that since social need to reduce vehicle $CO_2$ emissions is increased, the importance of fuel efficiency improvement technology is highlighted, a frictional force is decreased with a lower kinematic viscosity of the Lube base oil used, which increases fuel efficiency, and thus, the amount of low-kinematic viscosity Lube base oil used is greatly increased.

Related Art Document 1 (US Patent Registration No. 6150577) discloses a technology of producing Lube base oil by pyrolyzing waste plastic to recover pyrolysis oil, separating a heavy oil fraction having a boiling point of 650° F. or higher from a refined oil fraction, removing impurities by a hydrotreatment, and performing a hydroisomerization treatment. However, the raw material converted into a Lube base oil in Related Art Document 1 is a heavy oil fraction having a boiling point of 650° F. or higher, and the document does not disclose a technology of converting a light oil fraction having a boiling point of 650° F. or lower into a Lube base oil.

Related Art Document 2 (US Patent Registration No. 6288296) discloses a technology of producing Lube base oil having a high kinematic viscosity (@100° C.) of 8 cSt by pyrolyzing waste plastic to recover pyrolysis oil, separating heavy oil having a boiling point of 650° F. or higher from a refined oil fraction, performing a dimerization treatment, removing impurities by hydrogenation, and then performing a structural isomerization treatment. However, Related Art Document 2 discloses a technology of producing a high-viscosity Lube base oil, since considering that the content of impurities such as N, Cl, and S in pyrolysis oil dimerized using a metal/zeolite catalyst are high, operation durability is low, an impurity process is added to increase process complexity, and a heavy oil fraction having a boiling point of 650° F. or higher is used as a raw material. Related Art Document 2 also does not disclose a technology capable of converting a light oil fraction having a boiling point of 650° F. or lower into Lube base oil.

In the case of selectively converting a middle distillate having a boiling point in a range of 180 to 340° C. in waste plastic pyrolysis oil into a Lube base oil having a useful kinematic viscosity (@100° C.) of 4 cSt in the Lube base oil, the ripple effect is expected to be large in the related art.

SUMMARY OF THE INVENTION

Conventionally, since the pyrolysis oil of waste plastic is subjected to a hydrotreatment method as a method of removing chlorine (Cl), sulfur (S), nitrogen (N), and the like, a large amount of olefins is saturated by the hydrotreatment, making it difficult to produce Lube base oil by increasing a molecular weight. An embodiment of the present invention is directed to use a solid acid material which derives a reaction of oligomerizing an olefin while removing impurities to oligomerize a middle distillate of pyrolysis oil having high impurities which is difficult to apply as Lube base oil, and then selectively produce only Lube base oil having a kinematic viscosity of 4 cSt by a hydroisomerization reaction.

The Lube base oil produced by the present invention has a high content of a branched olefin and a low content of naphthene to show superior physical properties to petroleum-based Lube base oil having a relatively high naphthene content, and allows selective production of only a Lube base oil having a kinematic viscosity of 4 cSt.

In one general aspect, a method of producing a Lube base oil composition includes: a process or step a) reacting at least a part of waste plastic pyrolysis oil having a boiling point in a range of 180 to 340° C. to remove impurities and oligomerize the oil; and a process or step b) hydroisomerizing at least a part of the product of the process a).

Before the process (step) of a), a process of separating at least a part of the waste plastic pyrolysis oil into a first oil fraction, a second oil fraction, and a third oil fraction may be further included, wherein the first oil fraction has a boiling point of 180 to 340° C., the second oil fraction has a boiling point of lower than 180° C., and the third oil fraction has a boiling point of more than 340° C.

In the process a), the waste plastic pyrolysis oil may include 20 wt % of olefins with respect to the total weight.

The waste plastic pyrolysis oil may include 1 to 5,000 ppm of chlorine with respect to the total weight.

The process a) may include reacting at least a part of the waste plastic pyrolysis oil with a solid acid material.

The solid acid material may be included at 3 to 30 wt % with respect to the total weight of the waste plastic pyrolysis oil and the solid acid material.

The waste plastic pyrolysis oil from which impurities have been removed by the process a) may include less than 10 ppm of chlorine and 5 vol % or less of olefins with respect to the total weight.

The process b) includes reacting at least a part of the product of the process a) with a hydroisomerization catalyst, and the hydroisomerization catalyst may include at least one metal selected from the group consisting of platinum (Pt), palladium (Pd), nickel (Ni), iron (Fe), copper (Cu), chromium (Cr), vanadium (V), and cobalt (Co); and at least one support selected from the group consisting of alumina, silica, silica-alumina, zirconia, ceria, titania, zeolite, and clay.

In the process b), a process c) of separating the hydroisomerized waste plastic pyrolysis oil by boiling point may be further included.

The process b) of hydroisomerization may satisfy the following Relation 1:

$$0.95 < A/B < 1.05 \quad \text{[Relation 1]}$$

wherein A and B are weight average molecular weights of the waste plastic pyrolysis oil from which impurities have been removed before hydroisomerization treatment (A) and after hydroisomerization treatment (B), respectively.

In another general aspect, a Lube base oil composition produced from the waste plastic pyrolysis oil having a boiling point in a range of 180 to 340° C. wherein the Lube base oil composition has a kinematic viscosity (@100° C.) of 3.5 to 4.5 cSt.

The Lube base oil composition may have a viscosity index of 120 or more, a low-temperature viscosity (CCS, @-35° C.) of 3,000 cP or less, and a pour point of 15° C. or lower.

The Lube base oil composition may have a viscosity index of 120 or more, a low-temperature viscosity (CCS, @-35° C.) of 600 to 2,200 cP, and a pour point of −60 to 10° C.

Other features and aspects will be apparent from the following detailed description, the drawings, and the claims.

DESCRIPTION OF THE INVENTION

Figure 1:
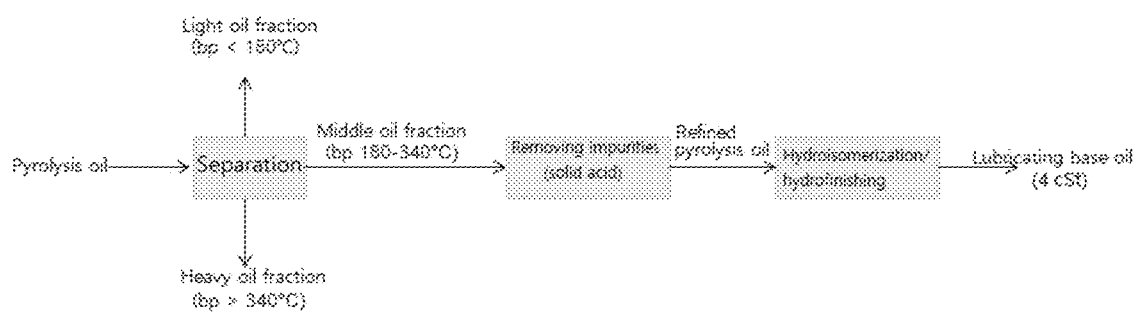
FIG. 1 is a schematic diagram of a method of producing a Lube base oil composition with a middle distillate oil fraction having a boiling point of 180 to 340° C. in waste plastic pyrolysis oil according to an exemplary embodiment of the present invention.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, "A to B" refers to "A or more and B or less", unless otherwise particularly defined.

In addition, "A and/or B" refers to at least one selected from the group consisting of A and B, unless otherwise particularly defined.

In the present specification, unless otherwise defined, boiling points (bp) of a first oil fraction, a second oil fraction, and a third oil fraction refer to those measured at normal pressure (1 atm).

In the present specification, unless otherwise defined, waste plastic pyrolysis oil having a boiling point in a range of 180 to 340° C. refers to pyrolysis oil of which 70% or more, 80% or more, 90% or more, 95% or more, or as an example, 100% has a boiling point in a range 180 to 340° C. with respect to the total weight of the waste plastic pyrolysis oil.

A method of producing a Lube base oil composition according to an exemplary embodiment of the present invention is provided. The method includes: a process or step a) reacting at least a part of waste plastic pyrolysis oil having a boiling point in a range of 180 to 340° C. to remove impurities and oligomerize the oil; and a process or step b) hydroisomerizing at least a part of the product of the process (step) a).

An exemplary embodiment of the present invention may further include: a process of separating at least a part of the waste plastic pyrolysis oil into a first oil fraction, a second oil fraction, and a third oil fraction, before the process a), wherein the first oil fraction has a boiling point in a range of 180 to 340° C., the second oil fraction has a boiling point in a range lower than 180° C., and the third oil fraction has a boiling point in a range higher than 340° C. At the separation process, a known fractional distillation method such as atmospheric distillation and reduced pressure distillation may be applied.

The waste plastic pyrolysis oil having a boiling point in a range of 180 to 340° C. as the first oil fraction separated may include a C9-C20 oil fraction. The first oil fraction may include 30 to 90 wt % of normal paraffins, 0.1 to 30 wt % of isoparaffins, 0.1 to 90 wt % of olefins, 0.1 to 20 wt % of naphthene, and 0.1 to 20 wt % of an aromatic compound, preferably 40 to 70 wt % of normal paraffins, 0.1 to 10 wt % of isoparaffins, 5 to 60 wt % of olefins, 0.1 to 5 wt % of naphthene, and 0.1 to 5 wt % of an aromatic compound.

Specifically, the waste plastic pyrolysis oil having a boiling point in a range of 180 to 340° C. may include at least 20 wt o, 20 to 90 wt o, or 20 to 60 wt % of olefins. Conventionally, a large amount of olefins is saturated by a hydrogenation treatment, so that it is difficult to produce Lube base oil by increasing a molecular weight, but in the present invention, the middle distillate of pyrolysis oil having a high content of impurities is treated to remove impurities therefrom and also oligomerized, and may be produced into only a Lube base oil having a kinematic viscosity of 4 cSt by a hydroisomerization treatment.

In addition, the first oil fraction may include 1 to 5,000 ppm of Cl, 1 to 1,000 ppm of S, and/or 10 to 5,000 ppm of N, specifically 5 to 1,000 ppm of Cl, 5 to 100 ppm of S, and/or 10 to 1,000 ppm of N, and more specifically 50 to 300 ppm of Cl, 5 to 80 ppm of S, and/or 50 to 700 ppm of N, as impurities.

The first oil fraction having a boiling point in a range of 180 to 340° C. has a low kinematic viscosity due to the relatively low number of carbon atoms and has a low content of impurities such as S, N, olefins, and Cl, and thus, it is difficult to directly apply the first oil fraction as Lube base oil.

The second oil fraction and the third oil fraction are waste plastic pyrolysis oil having boiling points of lower than 180° C. and higher than 340° C., respectively, and the second oil fraction may include a C8 or lower oil fraction and the third oil fraction may include a C21 or higher oil fraction. The second oil fraction and the third oil fraction include a high content of linear hydrocarbons and a content ratio between a paraffin and an olefin may be partly varied depending on the method of producing waste plastic pyrolysis oil, but generally have a higher ratio of paraffin, includes a small amount of branched hydrocarbons, and may include a small amount of naphthenes and aromatics resulted from the waste plastic pyrolysis oil. Since the second oil fraction has an impurity content higher than those of the first oil fraction and the third oil fraction, and requires a high-level impurity treatment technology, it is not preferred in terms of economic feasibility by productization. The third oil fraction may be present in a wax form at room temperature. The third oil fraction may be converted into a Lube base oil by a structural isomerization after removing impurities (such as Cl, N, and S) which may cause catalyst deactivation and process abnormality according to process standards, or may be converted into a petrochemical material having a smaller molecular weight by a second treatment such as cracking.

The waste plastic pyrolysis oil may further include biomass pyrolysis oil, regenerated lubricating oil, crude oil having a high chlorine content, or a mixture thereof. Since a large amount of impurities produced by a cracking or pyrolysis reaction of waste materials such as waste plastic pyrolysis oil includes a large amount of impurities caused by waste materials, there is a risk of air pollutant emission when using the waste plastic pyrolysis oil, and in particular, a Cl component is converted into HCl in a treatment process at high temperature and discharged or causes device corrosion, it is necessary to pretreat the waste plastic pyrolysis oil to remove impurities.

In addition, the waste plastic pyrolysis oil may include H-Naphtha (~C8, bp<180° C.) and middle distillate (C9~C20, bp 180~340° C.): VGO/AR (C21~, bp>340° C.) at a weight ratio of 50:50 to 90:10, at a weight ratio of 50:50 to 80:20, at a weight ratio of 50:50 to 70:30, or at a ratio of 50:50 to 60:40. The waste plastic pyrolysis oil used in the present invention may not proceed with oil hardening by catalytic cracking in the production of waste plastic pyrolysis oil. Since the waste plastic pyrolysis oil is applied as a raw material, a selectivity of Lube base oil having a kinematic viscosity of 4 cSt during the waste plastic pyrolysis is low, but the production method of the present invention is applied to waste plastic pyrolysis oil to produce a Lube base oil composition having a final kinematic viscosity of about 4 cSt in a high yield. The object of the present invention is to separate linear hydrocarbons of a middle distillate (C9-C20), which is post-treated and then applied as Lube base oil. In addition, in the present invention, high-quality Lube base oil having a kinematic viscosity of 3.5 to 4.5 cSt, 3.7 to 4.3 cSt, 3.9 to 4.3 cSt, or as an example, 4 cSt may be produced by a further structural isomerization of an oligomerized oil fraction in the hydroisomerization process (post-treatment).

The process a) of removing impurities and oligomerizing is to react at least a part of the waste plastic pyrolysis oil having a boiling point in a range of 180 to 340° C. to remove impurities and oligomerize the oil, and it is preferred to react at least a part of the waste plastic pyrolysis oil and a solid acid material.

In the present invention, the reaction of removing a chlorine impurity included at a high content in the waste plastic pyrolysis oil may be largely classified into two types. One type may be to convert chlorine in a hydrocarbon structure into HCl by a reaction by an active site of a solid acid catalyst, and then discharge converted HCl or HCl with a small amount of organic Cl. The other type may be to directly bond Cl to an active site of the solid acid material and remove it. However, a hydrotreating (HDT) process as a conventional technology is a technology of removing Cl by hydrogen injection ($H_2$ feeding), and specifically, organic-Cl in an oil vapor form may be removed. This is not preferred since the waste plastic pyrolysis oil cracked by the hydrogenation reaction reacts with Cl to form organic-Cl to increase gassing, and thus, a product loss is large and the content of an olefin component included in the waste plastic pyrolysis oil may be increased.

In the present invention, a dimerization reaction of pyrolysis oil and a reaction of reducing impurities such as Cl and N occur in one reaction, and the present invention is different from the sequential combination of a conventional technology of reducing Cl and N by an adsorbent and a conventional technology of oligomerizing a refined oil fraction. Specifically, in the conventional technology, Cl may be reduced by introducing an adsorbent such as CaO to convert Cl in pyrolysis oil into HCl, N may be reduced by converting N in pyrolysis oil into $NH_3$ by a hydrotreatment, and also, the refined oil fraction as such may be converted into an oligomer by an oligomerization catalytic reaction. However, it may be very difficult or impossible to derive both the reduction of Cl and N and the oligomerization reaction at the same time in one reactor by the conventional technology.

In addition, the conventional technology of reducing Cl, N, and the like by an adsorbent does not oligomerize an oil fraction by a solid acid catalyst such as zeolite, and when a Ziegler-Natta catalyst system such as $AlCl_3$ or a metallocene catalyst system is used, a raw material oil fraction having a very low impurity content is required, and thus, the adsorbent should be used in a very high content (2 to 50 times the level of the oil fraction to be refined). In addition, since the material to which Cl, N, and the like are adsorbed loses adsorption ability, a deactivated adsorbent should be continuously replaced. Due to the characteristics in that the amount of adsorbent required is very large as compared with an oil fraction and the continuous replacement of the adsorbent is needed, it is difficult to derive reduction of impurities by an adsorbent and an oligomerization reaction in one reactor.

In another conventional technology, Cl and N may be removed by converting them into HCl and $NH_3$ by a hydrogenation reaction, not adsorption reduction. However, in this case, since not only the reaction of conversion into HCl and $NH_3$ and removal is performed in the hydrogenation reaction process, but also unsaturated double bonds in the oil fraction are saturated by the hydrogenation, there is no olefin in the hydrogenated oil fraction and the structural isomerization reaction may not be sufficiently derived.

For this reason, conventionally, it is difficult to apply the method of removing Cl, N, and the like by adsorption or a hydrogenation reaction and an oligomerization catalytic reaction in combination as one reaction.

The present invention uses a solid acid material, thereby using the acid site of the solid acid material as the active site of the oligomerization reaction and also deriving adsorption of Cl or conversion into HCl to remove Cl. In addition, since N is bonded to the acid site of the solid acid material and removed by neutralization, the same solid acid material is introduced to one simple reactor, and both reduction of impurities and oligomerization may be performed. In addition, since the solid acid material may derive a branching reaction and a shift reaction of olefins as well as the oligomerization reaction of olefins, products having various physical properties with low-temperature properties being adjusted may be manufactured with the same raw material by changing operation conditions in the oligomerization reaction.

The process a) of removing impurities and oligomerizing may be performed in a pressure of 1 bar or more and 100 bar or less under an inert gas atmosphere and at a temperature of 200° C. or higher and lower than 380° C.

Specifically, the process of removing impurities may be performed under pressure conditions of 1 to 100 bar of Ar or $N_2$, 1 to 60 bar of Ar or $N_2$, or 1 to 40 bar of Ar or $N_2$. When the reaction is carried out under high vacuum or low vacuum conditions of less than 1 bar, a catalytic pyrolysis reaction occurs to decrease the viscosity and the molecular weight of the pyrolysis oil and change the composition of the oil product. In particular, Cl is bonded to an olefin to form organic-Cl to be removed, thereby causing a product loss. However, when the pressure is more than 100 bar, reactor operation is difficult and process costs are increased, which is thus not preferred.

The process of removing impurities may be performed at 200 to 380° C., 230 to 360° C., 240 to 340° C., or 260 to 335° C., preferably 260 to 280° C. or 295 to 335° C. As the temperature is raised in the temperature range described above, a Cl reduction effect may be increased, but at an excessively high temperature, cracking reaction activity is increased to decrease the selectivity of an oil fraction having a high boiling point range which may be applied as the Lube base oil, which is thus not preferred. Specifically, since operation at a low temperature of lower than 200° C. may greatly decrease a conversion catalytic reaction to convert chlorine (Cl) contained in the waste plastic pyrolysis oil into hydrochloric acid (HCl), a catalyst content and reaction temperature/time and the like for complementing this should be increased, and thus, the operation at a low temperature is somewhat disadvantageous in terms of economic feasibility for treating the waste plastic pyrolysis oil having a high Cl content. In addition, operation at a high temperature higher than 380° C. activates a cracking reaction, which may lead to a decrease in an oil fraction yield by an increase in the amount of a gas component produced.

The solid acid material includes a Bronsted acid, a Lewis acid, or a mixture thereof, and specifically, may be a solid material in which a Bronsted acid site or a Lewis acid site is present, and the solid acid material may be zeolite, clay, silica-alumina-phosphate (SAPO), aluminum phosphate (ALPO), metal organic framework (MOF), silica alumina, or a mixture thereof.

Meanwhile, the solid acid material is a solid material having a site capable of donating $H^+$ (Bronsted acid) or accepting a lone pair of electrons (Lewis acid), and allows derivation of various reactions such as cracking, alkylation, and neutralization depending on energy at an acid site. In the present invention, the solid acid material is activated in specific process conditions, thereby carrying out a catalytic conversion reaction to convert Cl into HCl. As a result, a high content of Cl in the waste plastic pyrolysis oil may be reduced to a several ppm level, and product abnormality (for example, cracking) and a yield loss (in the case in which Cl is removed as organic Cl, the case in which the oil is cracked and removed as gas, and the like) may be minimized.

As the solid acid material, waste zeolite, waste clay, and the like which are discarded after use in a petrochemical process are used as they are or used after a simple treatment for further activity improvement. For example, a fluidized bed catalyst is used in a RFCC process in which a residual oil is converted into a light/middle distillate, and in order to maintain the entire activity of the RFCC process constant, a certain amount of catalyst in operation is replaced with a fresh catalyst every day, and the replaced catalyst herein is named RFCC equilibrium catalyst (E-Cat) and discarded entirely. RFCC E-Cat may be used as the solid acid material of the present invention, and the RFCC E-Cat may be formed of 30 to 50 wt % of zeolite, 40 to 60 wt % of clay, and 0 to 30 wt % of other materials (alumina gel, silica gel, functional material, and the like). By using RFCC E-Cat as the solid acid material for reducing Cl in the waste plastic pyrolysis oil having a high content of Cl, a difference in cracking activity from the fresh catalyst is small, and costs are reduced through environmental protection and reuse.

A simple treatment may be needed in order to use the waste zeolite, the waste clay, and the like as the solid acid material of the process of the present invention, and when a material such as coke or oil physically blocks the active site of the solid acid material, it is preferred to use the waste zeolite, waste clay, and the like after removing the blocking material. Air burning may be performed for removing coke, or a solvent treatment may be performed for oil removal. If necessary, when the metal component affects the active site of the solid acid material and deactivates the active site, a DeMet process in which a treatment with a weak acid or dilute hydrogen peroxide at a medium temperature is performed to remove the metal component may be applied.

As an example, a catalyst used for reducing impurities in the present invention may be subjected to air burning under a simple atmosphere to regenerate an active site. Catalyst regeneration may be performed by the air burning at 450 to 550° C. under the atmosphere. Nitrogen ($N_2$) stripping performed at 450 to 550° C. under a nitrogen atmosphere may regenerate some active sites of the catalyst, but is not effective as compared with air burning.

In the process a), the solid acid material may be included at 3 to 30 wt %, preferably 3 to 10 wt % or 5 to 10 wt % with respect to the total weight of the waste plastic pyrolysis oil and the solid acid material. Within the range, as the amount of the solid acid material introduced is increased, a Cl removal effect may be improved, and when the amount is 30 wt % or less, a cracking reaction in the oil fraction may be suppressed, thereby oligomerizing the waste plastic pyrolysis oil simultaneously with Cl removal.

In the process a), the waste plastic pyrolysis oil from which the impurities have been removed may include 10 ppm or less, 9 ppm or less, 8 ppm or less, or 7 ppm or less of chlorine. Within the range of the chlorine content, in the process b) of hydroisomerization, production of organic-Cl in an oil vapor form may be suppressed, production of organic-Cl by a reaction a general between some cracked waste plastic pyrolysis oil and residual Cl may be suppressed, and an increase in the content of the olefin component may be suppressed. Thus, a Lube base oil composition having a high content of isoparaffin may be produced in a high yield.

The waste plastic pyrolysis oil from which impurities have been removed may include 5 wt % or less, 3 wt % or less, or 0.1 to 3 wt % of olefins with respect to the total weight. As the olefin content is high, the amount of $H_2$ consumed to be used in saturation in the hydroisomerization treatment process is increased, so that it is difficult to secure economic feasibility, and the amount of oil vapor produced in the process b) of hydroisomerization is increased, so that a product loss may occur.

When Cl is removed from the waste plastic pyrolysis oil according to the present invention, the average molecular weight and/or the viscosity of the waste plastic pyrolysis oil may be somewhat increased by the oligomerization reaction of olefins and the alkylation reaction between an olefin and branched paraffin in the waste plastic pyrolysis oil, and thus, the oligomerized oil fraction capable of applying to the Lube base oil may be produced. Specifically, the product of process a), that is, the waste plastic pyrolysis oil from which impurities have been removed and which is oligomerized, may include 30 wt % or more or 40 wt % or more, preferably 45 wt % or more or 55 wt % or more, more preferably 70 wt % or more, 80 wt % or more, or 90 wt % or more of the waste plastic pyrolysis oil having a boiling point in a range of 340° C. or higher with respect to the total weight.

Figure 2:
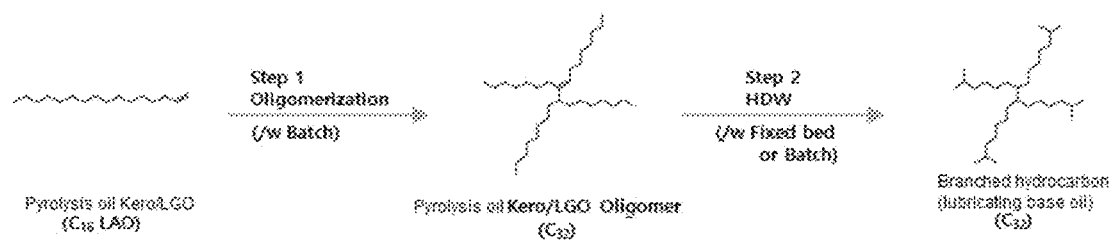
FIG. 2 is a schematic diagram showing an oil fraction composition according to each process of the method of producing Lube base oil of the present invention.

FIG. 2 is a schematic diagram showing an oil fraction composition according to each process of the method of producing Lube base oil of the present invention. In the process a), an alpha olefin which is the most of olefins in the pyrolysis oil undergoes both olefin shift and an oligomerization reaction, and referring to FIG. 2, the position of the olefin is gradually transferred to the center of the molecule by the acid site of the solid acid catalyst, and the oligomerization reaction of the thus-transferred internal olefins proceeds to produce a hydrocarbon having a X-shaped molecular structure. The produced hydrocarbon having X-shaped molecular structure may have better low-temperature properties than linear hydrocarbons.

In the process a), a structural isomerization reaction as well as olefin shift and an oligomerization reaction may occur at the same time. The structural isomerization is a reaction producing a methyl branch at the position of an olefin, and has an effect of improving low-temperature properties of an olefin fraction.

The production method of the present invention may further include a separation process of separating/recovering an oligomer component from the waste plastic oil fraction from which impurities have been removed, which was produced by the process a). In the process a), when the oil fraction having a boiling point of 180 to 340° C. is oligomerized, an oil fraction having a boiling point of 340° C. or higher is produced, and it is preferred to separate this for applying it as a Lube base oil.

In order to separate an oligomer having a boiling point in a range of 340 to 450° C., it is preferred to apply a reduced pressure distillation method to perform separation under vacuum. In the process a), the oligomer produced by the solid acid material may have a dimer selectivity of 70 wt % or more, preferably 80 wt % or more. The oligomer yield may be somewhat changed depending on the content of impurities in the waste plastic pyrolysis oil, but assuming that about 10% of the solid acid material is introduced to waste plastic pyrolysis oil having a high content of impurities at a temperature of about 200° C., an oligomer yield of 30 wt % or more may be expected. When the content of the solid acid material introduced and the reaction temperature are increased, the oligomer yield may be further improved.

Subsequently, the process b) is for removing olefin in the oil fraction and increasing the content of branched hydrocarbons, and is a process of hydroisomerization at least a part of the product of the process a).

In the process a), even though the oil fraction including oligomer in the form of branched hydrocarbon is produced, the produced oligomer component has insufficient low-temperature properties to directly apply it to the Lube base oil. This is because the ratio of linear hydrocarbons in the oligomer is still high, and in order to improve insufficient low-temperature properties, molecular branching may be further performed. In addition, impurities such as S, N, O, and Cl which have not been removed in the process a) and remain in the oil fraction may also be removed in the hydroisomerization process.

In the present invention, in the process (a), the impurities are removed without the hydroisomerization treatment, and then the process b) of hydroisomerization proceeds, so that the contents of chlorine and olefins in the oil fraction may be decreased to a very small amount, and also, low-temperature properties may be improved by branching of the hydrocarbon molecular end of the waste plastic pyrolysis oil, thereby achieving high-quality Lube base oil physical properties.

Specifically, in the process b), the waste plastic pyrolysis oil from which impurities have been removed may be subjected to a hydroisomerization (hydrobranching) reaction to produce a branched hydrocarbon.

In order to use it as the Lube base oil, there should be substantially no olefin in the oil fraction. However, since the waste plastic pyrolysis oil generally has a very high content of olefins of 50 mol %, the olefin content is present at several mol % or more even after removing the impurities by the solid acid material, and thus, it may be difficult to apply it directly to the Lube base oil. Therefore, it is preferred to remove the unsaturated double bond present in the molecule by saturating the double bond with hydrogen ($H_2$) by the hydroisomerization treatment. In the method of producing a Lube base oil composition of the present invention, a common, hydrogenation reaction for removing an unsaturated double bond is not performed, but it is characterized in that molecular branching is performed while an unsaturated double bond is removed by the hydroisomerization reaction.

The hydroisomerization reaction of the process b) may be performed under the conditions of a temperature of 140 to 400° C. and a $H_2$ pressure of 20 to 200 bar. Specifically, the hydroisomerization reaction of the process b) may be performed under the conditions of a temperature of 150 to 350° C. and a $H_2$ pressure of 20 to 150 bar, 20 to 130 bar, 20 to 100 bar, 20 to 80 bar, or 20 to 50 bar. The hydroisomerization reaction is performed under the relatively low temperature and pressure conditions, thereby further improving the yield of the branched hydrocarbon. The $H_2$ pressure range is characterized by being very low as compared with the pressure range of the hydroisomerization reaction of 160 to 250 bar in a general oil refining process. Thus, in the present invention, the branched hydrocarbon may be a branched hydrocarbon having one or two or more, preferably four or more branch structures, and may provide high-quality Lube base oil having improved low-temperature properties.

In the hydroisomerization reaction of the process b), a catalyst used in the hydroisomerization reaction in a common oil refining process may be used without particular limitation. The catalyst may be, for example, a catalyst in the form in which at least one metal selected from platinum (Pt), palladium (Pd), nickel (Ni), iron (Fe), copper (Cu), chromium (Cr), vanadium (V), and cobalt (Co) is supported on at least one support selected from alumina, silica, silica-alumina, zirconia, ceria, titania, zeolite, and clay.

The zeolite may be, for example, a mesopore zeolite (e.g., EU-1, ZSM-35, ZSM-11, ZSM-57, NU-87, ZSM-22, EU-2, EU-11, ZBM-30, ZSM-48, ZSM-23, or a combination thereof), but is not limited thereto.

In addition, the content of the metal component in the catalyst may be, for example, in a range of about 0.1 to 3 wt %, specifically about 0.3 to 1.5 wt %, and more specifically, about 0.3 to 1 wt %.

The hydroisomerization reaction of the process b) may be performed using a batch reactor or a fixed bed reactor, and when the fixed bed reactor is used, the reaction may be operated in a continuous manner, which is preferred in terms of productivity. When the fixed bed reactor is used, the reaction may be performed with a supply of a hydrogen gas, and an inert gas such as nitrogen, argon, and helium is mixed therewith for increasing reaction stability. A flow rate of the hydrogen gas to be introduced to the fixed bed reactor may be considered as one of the factors controlling reaction activity. Specifically, since the reaction is performed by a contact between a catalyst and a reactant, a retention time may be considered for controlling the reaction. Meanwhile, a weight hour space velocity (WHSV) using the fixed bed reactor may be adjusted to the range of, for example, 0.01 to 50 hr$^{-1}$, specifically 0.1 to 3 hr$^{-1}$, and more specifically 0.5 to 1.5 hr$^{-1}$.

The process b) of hydroisomerization of the present invention may produce 3 wt % or less, 1 wt % or less, preferably 0.1 to 1 wt % of oil vapor with respect to the total weight of the waste plastic pyrolysis oil from which impurities have been removed. In the conventional technology, a hydrocracking catalyst including zeolite is used to produce 10 wt % or more of the oil vapor in a hydrogenation reaction, but in the present invention, a hydroisomerization catalyst is used and an oil fraction having a reduced content of impurities (chlorine) and olefins is used as a raw material to suppress occurrence of oil vapor, and the Lube base oil composition desired in the present invention may be obtained in a high yield.

The process of hydroisomerization of the present invention may satisfy the following Relation 1:

$$0.95 < A/B < 1.05 \qquad \text{[Relation 1]}$$

wherein each of A and B is a weight average molecular weight of waste plastic pyrolysis oil from which impurities have been removed before and after hydroisomerization. Specifically, in Relation 1, A may be a weight average molecular weight of the product of the process a) and B may be a weight average molecular weight of the product of the hydroisomerization treatment of the process b).

As described above, the molecular weight distribution (boiling point distribution) in the waste plastic pyrolysis oil before and after the hydroisomerization treatment may be maintained at a constant level, thereby producing a C22-C40 Lube base oil composition in a high yield.

In addition, the process b) of hydroisomerization may further include a hydrofinishing reaction by a hydrofinishing catalyst.

As the catalyst, a catalyst used in the hydrogenation reaction during a common oil refining process may be used without particular limitation. Specifically, as a hydrogenation metal, a metal selected from Groups 6, 8, 9, 10, 11, and 12 of the periodic table, more specifically, Pt, Pd, Ni, Fe, Cu, Cr, V, Co, and the like may be used alone or in combination. More specifically, Pt and/or Pd may be used. In addition, the metal component supported on an inorganic oxide support, specifically, at least one or more supports of alumina, silica, silica-alumina, zirconia, ceria, titania, zeolite (e.g., Y zeolite, specifically, SAR of 12 or more), clay, SAPO, and AlPO, may be used.

The hydrofinishing process may be performed in ranges of, for example, a temperature of 150 to 500° C., specifically 180 to 350° C., and more specifically 200 to 350° C., a $H_2$ pressure of 5 to 200 bar, preferably 20 to 180 bar, and a $H_2$/feed ratio (GOR) of 300 to 2000 Nm$^3$/m$^3$, preferably 500 to 1500 Nm$^3$/m$^3$. In addition, when a continuous reaction, for example, a CSTR reactor is used, the hydrofinishing process may be performed at a weight hour space velocity (WHSV) of 0.1 to 5 hr$^{-1}$, 0.1 to 3 hr$^{-1}$, or 0.1 to 1 hr$^{-1}$.

In addition, a pretreatment hydrogenation process of selectively removing the conjugated diolefin in the olefin before the process b) of hydroisomerization may be further included. The conjugated diolefin may be converted into gum and the like by forming an oligomer during a reaction process to derive operation trouble. Thus, it is preferred that a pretreatment hydrogenation process of selectively removing the conjugated diolefin from the oil fraction, if necessary, depending on its content is performed before the process b) of hydroisomerization.

The pretreatment hydrogenation process may be performed at 40 to 300° C. and at a $H_2$ partial pressure of 5 to 100 bar. Since under the pretreatment hydrogenation process operation conditions, the conjugated diolefin may be removed easily as compared with the cases of removing an unsaturated double bond and impurities such as S and N, the conditions may be generally a mild condition as compared with the hydrogenation process operation conditions.

Meanwhile, the catalyst used in the pretreatment hydrogenation process may be a noble metal or MoS-based catalyst which is similar to the catalyst of the process b) of hydroisomerization. Specifically, when the content of impurities in the oil fraction produced in the process a) of removing impurities is low, a noble metal catalyst may be applied to perform a pretreatment hydrogenation process. Here, when a Pd/r-Al$_2$O$_3$ catalyst is applied as an example of the noble metal catalyst, the conjugated diolefin may be sufficiently selectively removed even under mild conditions of 40 to 150° C. and a $H_2$ partial pressure of 10 to 40 bar. In addition, when the MoS-based catalyst is used, the temperature and the hydrogen pressure are somewhat higher as compared with the operation conditions of the noble metal catalyst, but the pretreatment hydrogenation process may be performed even under the conditions of lower temperature and hydrogenation pressure than the process b) of hydroisomerization.

Meanwhile, the pretreatment hydrogenation process may be performed, specifically, after the process a) of removing impurities and before the process b) of hydroisomerization, and thus, a problem in the conventional technology of removing Cl by $H_2$ feeding in a hydrotreating (HDT) process and the like, in which a waste plastic pyrolysis oil is cracked and removed in an organic-Cl form, may be prevented.

The pre-hydrotreatment process may be, as an example, a liquid hydrogenation process, and may be performed in a fixed bed reactor. Specifically, the liquid waste plastic pyrolysis oil from which impurities have been removed may be continuously injected to the fixed-bed reactor filled with a pretreatment hydrogenation catalyst and hydrogen in a counter-current or co-current direction, thereby performing pretreatment hydrogenation. However, the present invention is not limited thereto.

The method of producing a Lube base oil composition of the present invention may further include separating an oil fraction which is hydroisomerized by the process b) by boiling points. As the separation process, a known fractional distillation method such as atmospheric distillation and reduced pressure distillation may be applied.

Another exemplary embodiment of the present invention provides a Lube base oil composition produced by the method of producing a Lube base oil composition. The Lube base oil composition is a Lube base oil composition produced from waste plastic pyrolysis oil having a boiling point in a range of 180 to 340° C., characterized by having a kinematic viscosity (@100° C.) of 3.5 to 4.5 cSt.

Specifically, the Lube base oil composition may have a kinematic viscosity (@100° C.) of 3.5 to 4.5 cSt, 3.7 to 4.5 cSt, 3.9 to 4.5 cSt, or 4.0 to 4.3 cSt, a viscosity index of 120 or more, CCS (low-temperature viscosity, @-35° C.) of 3,000 cP or less, 600 to 3,000 cP, or 600 to 2,200 cP, and/or a pour point of 15° C. or lower, −60 to 15° C., −60 to 10° C., or −60 to −20° C.

Meanwhile, the kinematic viscosity (@100° C.) may be measured in accordance with ASTM D445, the viscosity index may be measured in accordance with ASTM D2270, CCS was measured in accordance with ASTM 5293, and the pour point may be measured in accordance with ASTM D97.

The Lube base oil composition may include 0 to 30 wt % of normal paraffin, 30 to 99 wt % of the isoparaffin, 0.1 to 40 wt % of naphthene with respect to the total weight. Specifically, the Lube base oil composition may include 40 to 90 wt % or 50 to 80 wt % of isoparaffin with respect to the total weight. The Lube base oil composition may include 0 to 30 wt %, 1 to 20 wt %, or 2 to 10 wt % of normal paraffin. The Lube base oil composition may include 0.1 to 40 wt o, 1 to 30 wt o, 3 to 25 wt o, or 5 to 20 wt % of naphthene.

The Lube base oil composition may include 70 wt % or more, specifically 80 wt % or more, preferably 90 wt % or more of the hydrocarbon oil fraction having a boiling point in a range of 340 to 450° C. with respect to the total weight.

The Lube base oil composition may include less than 10 ppm or less than 5 ppm of chlorine (Cl), less than 10 ppm or less than 3 ppm of sulfur (S), and less than 10 ppm or less than 3 ppm of nitrogen (N).

Hereinafter, the preferred examples and the comparative examples of the present invention will be described. However, the following examples are only a preferred exemplary embodiment of the present invention, and the present invention is not limited thereto.

EXAMPLE 1

Figure 3:
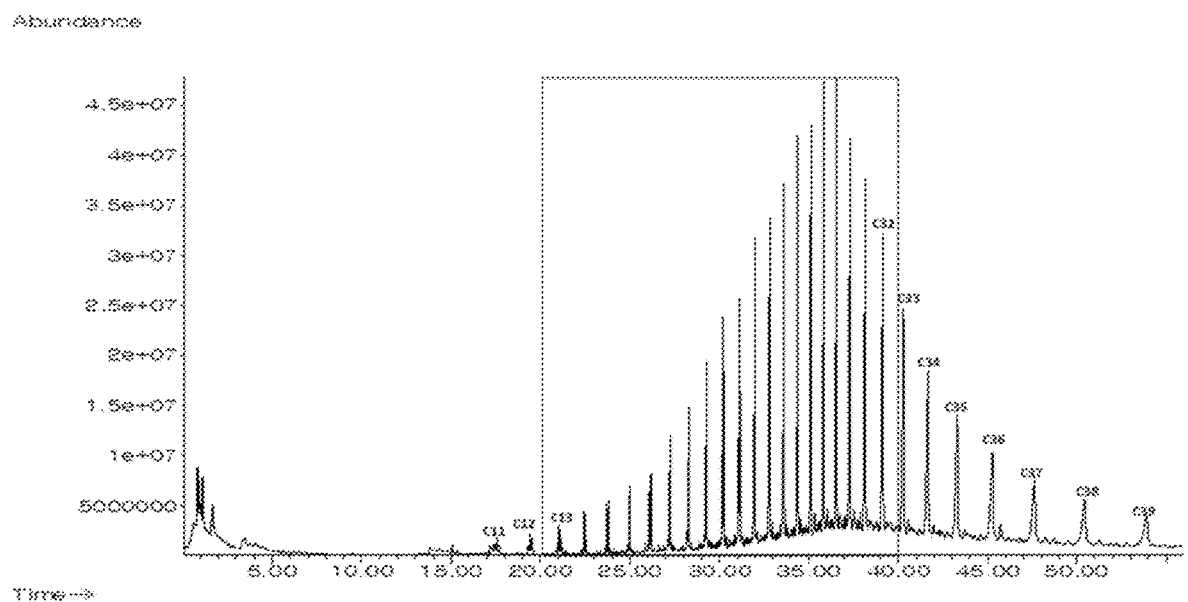
FIG. 3 is a graph showing GC-SimDist analysis for confirming a molecular weight distribution in waste plastic pyrolysis oil of Example 1.

Analysis of Composition of Waste Plastic Pyrolysis Oil Having High Content of Cl and Separation of Middle Distillate Waste plastic pyrolysis oil converted by pyrolysis of plastic waste was used as a raw material for producing Lube base oil. In order to confirm the effect of impurity removal and a molecular weight change by the reaction, the following analysis was performed. In order to confirm a molecular weight distribution in the waste plastic pyrolysis oil, GC-SimDist analysis (HT-750) was performed. ICP, TNS, EA-O, and XRF analyses were performed for the impurities, Cl, S, N, and O. In addition, GC-MSD analysis was performed for olefin content analysis. The analysis results are shown in Tables 1, 2, and 3, and FIG. 3.

TABLE 1

| Cut Name | Expected carbon range | Boiling point (° C.) | Yield (wt %) |
|---|---|---|---|
| H-Naphtha. | ~C8 | <150 | 8.1 |
| KERO | C9-C17 | 150~265 | 24.4 |
| LGO | C18-C20 | 265~340 | 22.7 |
| VGO/AR | C21~ | >340 | 44.8 |
| SUM | — | — | 100 |

TABLE 2

| Pyrolysis oil | Cl | N | S | O |
|---|---|---|---|---|
| mg/Kg | 67 | 348 | 20 | 1 |

In order to recover a middle distillate oil fraction which is a subject oil fraction to be converted into the Lube base oil by hydroisomerization, the waste plastic pyrolysis oil was separated by boiling points using a distillation device. H-naphtha was separated on a basis of a boiling point of ~180° C. at a normal pressure, and a middle distillate was separated by reduced pressure distillation on a basis of 180 to 340° C.

Figure 4:
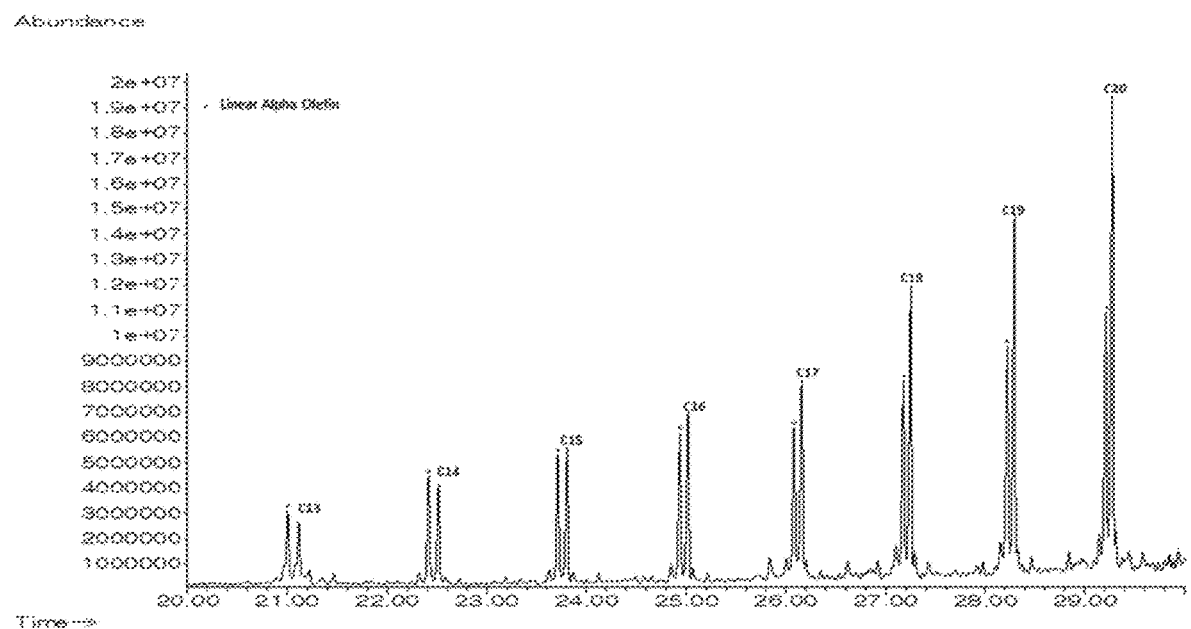
FIG. 4 is a graph showing 2D-GC analysis results of a Kero/LGO oil fraction separated from the waste plastic pyrolysis oil of Example 1.

Hydrogenation process introduction criteria were determined on the basis of Cl which is an impurity causing the most serious problem such as corrosion and a reactor blockage phenomenon in the hydrogenation process. The representative impurity which may cause device corrosion by HCl conversion is Cl, which is the important impurity in reducing N causing a reactor blockage by forming a $NH_4Cl$ salt in the operation conditions with HCl. In the process of reducing impurities, impurities such as N, S, O, and metal in addition to Cl were removed simultaneously. The content of the impurities, Cl, S, N, and O in the separated middle distillate oil fraction and the metal content are shown in the following Table 3. In addition, the 2D-GC analysis results are shown in FIG. 4. The middle distillate was confirmed to be a mixture of n-paraffin and olefins, and most of the olefins were confirmed to be an alpha-olefin.

TABLE 3

| | Middle distillate |
|---|---|
| Cl, wppm | 68 |
| S, wppm | 28 |

TABLE 3-continued

| | Middle distillate |
|---|---|
| N, wppm | 367 |
| O, wt % | 0.36 |
| Fe, wppm | 3.9 |
| Ca, wppm | 1.5 |
| Na, wppm | 1.1 |
| As, wppb | 9.3 |

EXAMPLE 2

Cl Reduction Reaction in Oil Fraction by Treating at High Temperature with Solid Acid Material

EXAMPLE 2-1

Preparation of Solid Acid Material

In order to remove Cl from the liquid middle distillate of Example 1, a solid acid material was prepared. As the solid acid material, RFCC E-cat, which is a material having a Bronsted or Lewis acid site, was used. The physical properties of the RFCC E-cat. used are shown in Table 4. In addition, the content of impurities included in the catalyst are shown in Table 5.

TABLE 4

| | Type | | | | | |
|---|---|---|---|---|---|---|
| | TSA ($m^2/g$) | ZSA ($m^2/g$) | MSA ($m^2/g$) | Z/M Ratio | PV (cc/g) | APD (Å) |
| RFCC E-cat | 122 | 36 | 86 | 0.42 | 0.20 | 67 |

In Table 4, TSA is a total specific surface area, ZSA is a zeolite specific surface area, MSA is a meso or larger pore specific surface area, Z/M is a ratio of the zeolite specific surface area (ZSA) to the meso or larger pore specific surface area, PV is a pore volume, and APD is an average pore diameter.

TABLE 5

| | RFCC E-cat | | | | | | | | | |
|---|---|---|---|---|---|---|---|---|---|---|
| | Na | Ni | V | Fe | Mg | P | $La_2O_3$ | $CeO_2$ | $TiO_2$ | $SiO_2$ | $Al_2O_3$ |
| wt % | 0.13 | 0.53 | 1.21 | 0.65 | 0.07 | 0.56 | 0.69 | 0.10 | 0.78 | 40 | 53 |

The RFCC E-cat used was a catalyst having a total specific surface area of 122 $m^2/g$, a pore volume of 0.20 cc/g, and an average particle size of 79 μm.

EXAMPLE 2-2

Oligomerization Process in Middle Distillate Oil Fraction by Solid Acid Material 99.9 kg of the middle distillate oil fraction recovered in Example 1 and 30 kg of RFCC E-cat. were introduced to a 200 L autoclave, $N_2$ purging was performed three times, and it was confirmed that there was no leak in equipment by a leak test at 30 bar of $N_2$. Thereafter, $N_2$ was vented, the equipment was operated at 1 bar of $N_2$, and the reaction temperature was raised to 180° C. Subsequently, the temperature was maintained at 180° C. for 6 hours, and was lowered to room temperature with stirring to end the reaction. Thereafter, venting was performed at room temperature, the autoclave was released to recover a reactant and a waste catalyst, and filtration was performed to recover the treated middle distillate. The reaction was repeated until a Cl content was 2 wppm or less. Important change in the physical properties related to the Lube base oil product before and after the reaction are shown in the following Table 6. It was confirmed that Cl, N, S, O, and the like were greatly decreased, and in particular, most of the metal was removed.

TABLE 6

|  | Cl (ppm) | N (ppm) | S (ppm) | O (wt %) | Fe (ppm) | Ca (ppm) | Na (ppm) | As (ppb) |
|---|---|---|---|---|---|---|---|---|
| Before reaction (%) | 68 | 367 | 28 | 0.4 | 4 | 1.5 | 1.1 | 9.3 |
| After reaction (%) | 2 | N.D | 5 | <0.1 | N.D | N.D | N.D | N.D |

EXAMPLE 2-3

Separation Process of Oligomer in Oil Fraction

In order to separate an oligomer oil fraction having a boiling point of 340° C. higher from 89.1 kg of the oil fraction recovered in Example 2-2, distillation under reduced pressure was performed. The separation was performed from 89.1 kg of the recovered oil fraction at 145° C. under a vacuum condition of 1 torr, and the oil fraction which remains without being distilled was recovered. The amount of the light oil fraction having a boiling point in a range of 340° C. or lower which was recovered by the distillation was 45.3 kg, the amount of the residual oil fraction which was not distilled and expected to have a boiling point in a range of 340° C. higher was 41.6 kg, and an operation loss was 2.5 wt %.

EXAMPLE 2-4

Structural Isomerization Process of Middle Distillate Oil Fraction Having Reduced Impurities The oligomer oil fraction recovered in Example 2-3 was subjected to a hydroisomerization reaction using a fixed bed continuous reactor. Each catalyst was loaded sequentially to the catalyst bed for the structural isomerization reaction and the catalyst bed for hydrofinishing reaction and the hydroisomerization reaction was performed. A Pt/zeolite catalyst having 1-dimensional pores was used in the hydroisomerization reaction and a PtPd/$SiO_2$—$Al_2O_3$ catalyst was used in the hydrofinishing reaction. The physical properties of the used catalysts are shown in Table 7.

6 cc of the hydroisomerization catalyst and 4 cc of the hydrofinishing catalyst were loaded to the fixed bed continuous reactor, and the catalyst was activated by the following process. The temperature was raised to 120° C. at a rate of 2° C./min under the conditions of $N_2$ normal pressure 100 sccm and then maintained for 2 hours to remove the impurities on the surface of the catalyst. Thereafter, $N_2$ was changed to $H_2$, and a $H_2$ pressure was increased to 35 bar at a rate of 10 bar/10 min. Thereafter, the temperature was raised at a rate of 2° C./min, maintained at 150° C. for 2 hours, raised at a rate of 2° C./min, and maintained at 330° C. for 5 hours to subject the catalyst to reduction activation. Thereafter, the temperature was slowly lowered to 150° C., and then the pressure was increased to 50 bar. Subsequently, the oil fraction recovered in Example 2-2 was introduced at 0.02 sccm and maintained for 5 hours to wet the catalyst. Thereafter, the oil introduction amount was increased to 0.12 sccm, the temperature was raised to 275° C., and then the sample after an initial stabilization process was recovered. The sample hydroisomerized at 275° C. was recovered in the same manner, and then the samples hydroisomerized at 300° C. and 320° C. were recovered, respectively.

TABLE 7

| Catalyst | Surface area (m²/g) | | | pore volume (cc/g) | Average pore diameter (Å) | Metal dispersion (%) |
|---|---|---|---|---|---|---|
| | Total | micro | external | | | |
| Isomerization catalyst | 199.4 | 71.9 | 127.5 | 0.34 | 69.5 | 73.1 |
| Finishing catalyst | 366.1 | 15.8 | 350.3 | 0.74 | 81.0 | 66.7 |

Figure 5:
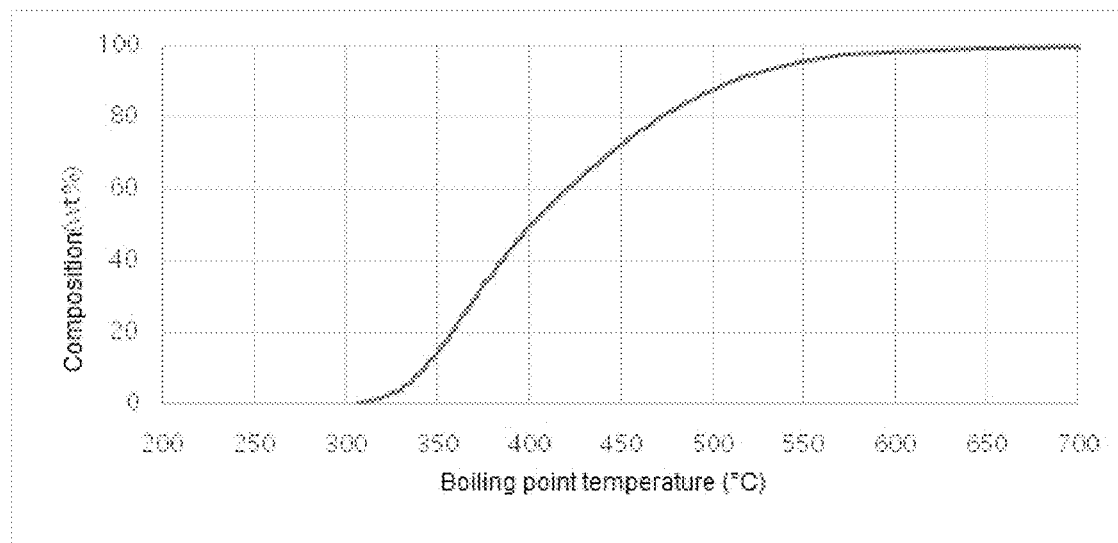
FIGS. 5 and 6 are graphs showing SimDist pattern of oil fractions hydroisomerized at 275° C. of Examples 2 to 4.
Figure 6:
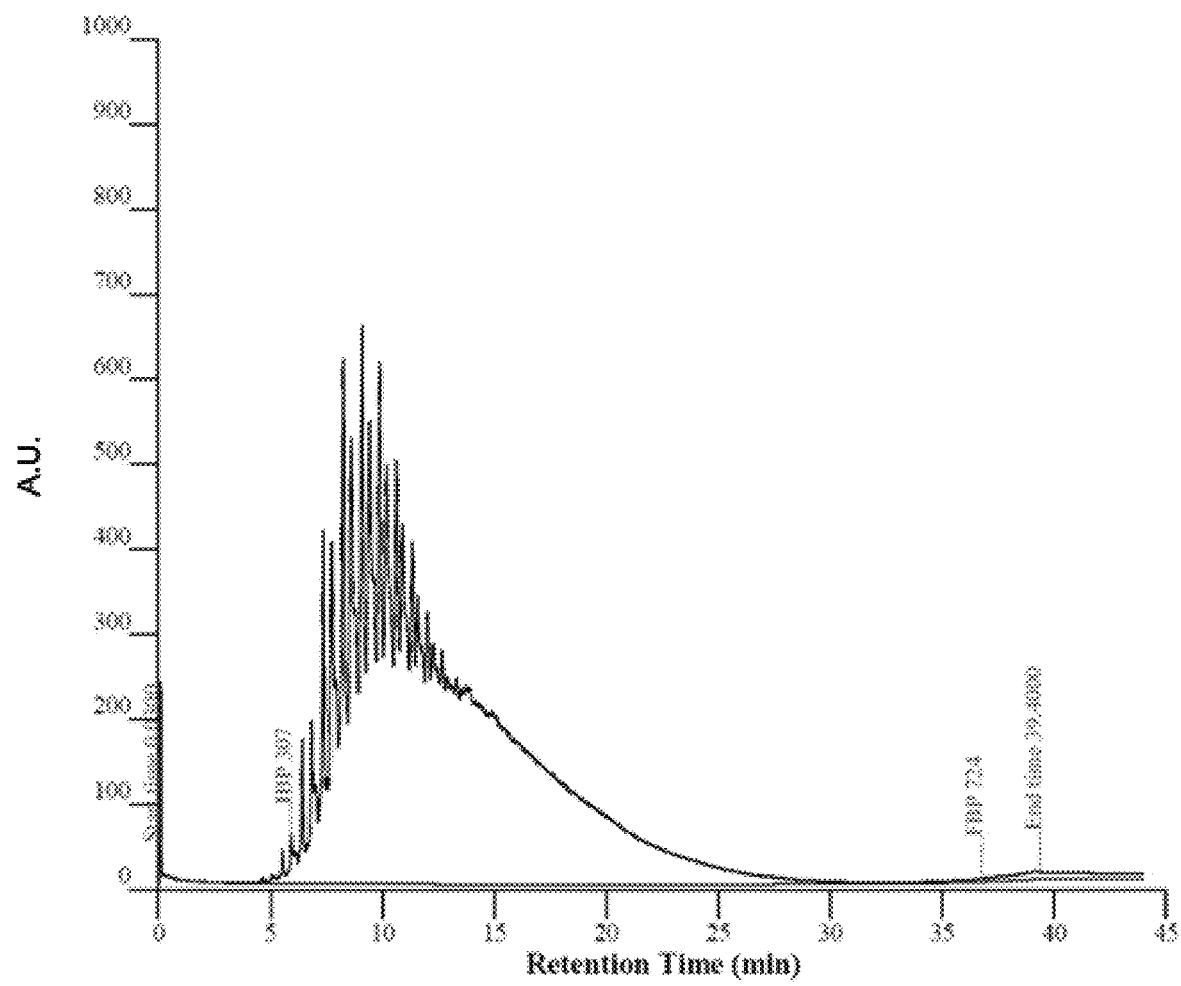

In order to remove the Middle distillate oil fraction produced by the cracking side reaction during the hydroisomerization process, the boiling point of 340° C. was cut to remove the oil fraction having a boiling point of 340° C. or lower and recover only the oil fraction having a boiling point of 340° C. higher. The SimDist pattern of the oil fraction recovered at a hydroisomerization reaction temperature of 275° C. is shown in FIGS. 5 and 6. It was confirmed that a small amount of the oil fraction having a boiling point of 340° C. or lower remained even after cutting.

EXAMPLE 2-5

Review of Applicability of Hydroisomerized Oligomer Oil Fraction as Lube Base Oil The physical properties of the Lube base oil of the hydroisomerized oligomer oil fraction recovered in Example 2-4 were analyzed to confirm the applicability as a Lube base oil product. The physical properties as the Lube base oil are shown in the following Table 8. The recovered oil fractions all had the kinematic viscosity of 4.14 to 4.26 cSt (@100° C.) and may be considered as being a product range having a kinematic viscosity of 4 cSt. In addition, the physical properties of the viscosity index of 120 or more for use as the Lube base oil were satisfied. Smaller CCS (@-35° C.) is better, and considering that the petroleum-based Gr III Lube base oil having the same kinematic viscosity generally has CCS of 2900 cP, the Lube base oil of Example 2-3 had CCS of 725-2125 cP, which shows high-quality physical properties. In particular, considering that PAO which is a 4 cSt Gr IV Lube base oil derived from C10 LAO which is considered as a Lube base oil of highest quality had CCS physical properties of about 1150 cP, it was confirmed to be almost equivalent to or inferior to PAO. The pour point should be generally −20° C. or less. From this point of view, the oil fraction recovered at 275° C. had a pour point of 12° C., and it was confirmed that it was difficult to apply the oil fraction alone as the Lube base oil. However, it was confirmed that the oil fraction had excellent CCS of 725 cP, and thus, may be used as an additive for increasing CCS of a Lube base oil. It was confirmed that the oil fraction recovered at a hydroisomerization temperature of 300° C. or higher had a pour point of −29° C. which satisfied the pour point criterion of the Lube base oil, and the oil fraction recovered at 320° C. also had a pour point of −57° C. and showed very good low-temperature properties. In the case of Saybolt number which is the criterion for measuring the transparency of the Lube base oil, all oil fractions had the Saybolt number of 30, and thus, it was confirmed that the physical properties of the Lube base oil were satisfied.

The Lube base oil recovered from the waste plastic pyrolysis oil is, when it is limited to an oil fraction having a pour point of −20° C. or lower, recovered at a hydroisomerization temperature of 300° C. or higher, a product of a kinematic viscosity of 4 cSt, and it was confirmed that when compared with Gr IV PAO, the pour point and CCS were somewhat inferior, but the difference was not large, and when compared with the GTL-4 Lube base oil, the viscosity index was inferior but CCS was superior, and CCS and the pour point were superior to the Gr III Lube base oil which is the petroleum-based Lube base oil. Thus, it was confirmed that high-quality Lube base oil may be produced using the middle distillate having a boiling point in a range of 180 to 340° C. derived from the waste plastic pyrolysis oil. In addition, it was confirmed that by adjusting the hydroisomerization reaction temperature, product ranges having different CCS and pour point properties from each other may be produced even when the same raw material oil fraction was applied. For example, when CCS properties are required, the waste plastic pyrolysis oil middle distillate raw material is used to be treated at a low temperature of 275° C., thereby producing an oil fraction having low pour point properties but excellent CCS properties, and when the market environment changes and an oil fraction requiring excellent low-temperature properties rather than CCS physical properties is more required, an oil fraction having poor CCS physical properties but excellent pour point physical properties may be produced by a high-temperature treatment.

In the present invention, a middle distillate waste plastic pyrolysis oil having a boiling point in a range of 180 to 340° C. is treated to remove impurities such as Cl, S, N, and metal therefrom and subjected to an oligomerization treatment, and then, is hydroisomerized to produce a Lube base oil.

The present invention is characterized by a method of producing a Lube base oil which produces Lube base oil having a kinematic viscosity of 4 cSt in a selectivity of 70% or more, preferably 80% or more.

In addition, the present invention is preferred in terms of environmental protection, since waste plastic which may be converted into greenhouse gas or hazardous gas such as $SO_x$, $NO_x$, and Cl-containing gas when discarded or burned, is converted into industrially widely used Lube base oil.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

The invention claimed is:

1. A method of producing a lube base oil composition, the method comprising the steps of:
   a) separating at least a part of a waste plastic pyrolysis oil into a first oil fraction having a boiling point in a range of 180 to 340° C.;
   b) reacting the first oil fraction having a boiling point in a range of 180 to 340° C. with a solid acid material to remove impurities and oligomerize the oil; and
   c) hydroisomerizing at least a part of the product of the process a),
   wherein the process c) of hydroisomerization satisfies the following Relation 1:

$$0.95 < A/B < 1.05 \qquad \text{[Relation 1]}$$

wherein A and B are weight average molecular weights of the waste plastic pyrolysis oil from which impurities have been removed before hydroisomerization treatment (A) and after hydroisomerization treatment (B), respectively.

2. The method of producing a lube base oil composition of claim 1, further comprising the steps of:
   before the process a), separating at least a part of the waste plastic pyrolysis oil into a first oil fraction, a second oil fraction, and a third oil fraction,
   wherein the first oil fraction has a boiling point of 180 to 340° C., the second oil fraction has a boiling point of lower than 180° C., and the third oil fraction has a boiling point of higher than 340° C.

TABLE 8

|  | Test method | Pyrolysis oil middle distillate Lube base oil | | | Gr IV (PAO-4) | GTL-4 | Gr III (YU-4) |
| --- | --- | --- | --- | --- | --- | --- | --- |
| Hydroisomerization temperature (° C.) | — | 275 | 300 | 320 | — | — | — |
| Kinematic viscosity (@100° C., cSt) | D445 | 4.14 | 4.15 | 4.26 | 3.86 | 4.08 | 4.25 |
| Viscosity index | D2270 | 125 | 123 | 121 | 122 | 130 | 124 |
| CCS (@ −35° C., cP) | D5293 | 725 | 1450 | 2125 | 1150 | 1900 | 2900 |
| Pour point, ° C. | D97 | 12 | −29 | −57 | −66 | −30 | −15 |
| Saybolt No. | D156 | 30 | 30 | 30 | 30 | 30 | 30 |

3. The method of producing a lube base oil composition of claim 1, wherein the waste plastic pyrolysis oil in the process a) includes 20 wt % or more of olefins with respect to a total weight.

4. The method of producing a lube base oil composition of claim 1, wherein the waste plastic pyrolysis oil includes 1 to 5,000 ppm of chlorine with respect to the total weight.

5. The method of producing a lube base oil composition of claim 1, wherein the solid acid material is included at 3 to 30 wt % with respect to a total weight of the waste plastic pyrolysis oil and the solid acid material.

6. The method of producing a lube base oil composition of claim 1, wherein the waste plastic pyrolysis oil from which impurities have been removed by the process a) includes less than 10 ppm of chlorine and 5 vol % or less of olefins with respect to the total weight.

7. The method of producing a lube base oil composition of claim 1, wherein the process b) includes reacting at least a part of the product of the process a) with a hydroisomerization catalyst,
   wherein the hydroisomerization catalyst includes: at least one metal selected from the group consisting of platinum (Pt), palladium (Pd), nickel (Ni), iron (Fe), copper (Cu), chromium (Cr), vanadium (V), and cobalt (Co); and
   at least one support selected from the group consisting of alumina, silica, silica-alumina, zirconia, ceria, titania, zeolite, and clay.

8. The method of producing a lube base oil composition of claim 1, further comprising: c) separating the waste plastic pyrolysis oil hydroisomerized in the process b) by boiling points.

\* \* \* \* \*